United States Patent [19]
Boudinet et al.

[11] 3,781,710
[45] Dec. 25, 1973

[54] GAS LASER GENERATOR DEVICES

[75] Inventors: Guy Boudinet, Vitry; Jean Rocca-Serra, Paris, both of France

[73] Assignee: Compagnie Generale d'Electricite, Paris, France

[22] Filed: Sept. 22, 1972

[21] Appl. No.: 291,513

[30] Foreign Application Priority Data
Sept. 24, 1971  France .................................. 7134404

[52] U.S. Cl. .............................................. 331/94.5
[51] Int. Cl. ............................................ H01s 3/09
[58] Field of Search ..................... 331/94.5; 330/4.3

[56] References Cited
UNITED STATES PATENTS
3,344,365  9/1967  Lewis .............................. 331/94.5 K
3,521,193  7/1970  Wingfield et al. ............... 331/94.5 K Primary Examiner—William L. Sikes
Attorney—Richard C. Sughrue et al.

[57] ABSTRACT

A gas laser generator comprising two groups of electrodes for producing in two planes, substantially perpendicular electric discharges, the gain of each discharge being chosen so that the laser phenomenon takes place only on the intersecting straight line of the two discharge planes.

2 Claims, 2 Drawing Figures

GAS LASER GENERATOR DEVICES

BACKGROUND OF THE INVENTION

1. Field of the Invention

The present invention concerns laser generator devices and more particularly gas laser generator devices.

2. Description of the Prior Art

It is known that a gas laser generator consists of an optical resonant cavity formed by two mirrors, for example of the Perot-Fabry type, and means for producing, in that cavity, an excited medium having a certain power gain.

For the laser phenomenon to take place, it is necessary for the gain to be greater than or at lesat equal to the losses of the resonant cavity; this theory is conventional and well-known in a gas laser generator.

The means for producing an excited medium generally consist of a tube filled with a gas or a gaseous mixture. At least two electrodes are connected respectively to the two terminals of an electric power supply to produce an electric discharge in the gas. The tube, known as a discharge tube, is placed in the optical resonant cavity substantially along the axis of that cavity.

It is also known that the laser beam originates in the portion of the gas excited by the discharge under the above-mentioned condition, when the gain is greater than the losses.

SUMMARY OF THE INVENTION

Putting into application the above-mentioned principles, the present invention has for its aim the producing of a laser generator device capable of generating a narrow light beam. The present invention also aims at producing a laser generator device capable of generating several detached and parallel light beams.

The present invention has for its object a laser generator device comprising an optical resonant cavity. First means in the cavity produces an electric discharge in a gas substantially along a portion of a plane, known as the first discharge plane, this plane being parallel to the optical axis of the cavity. Second means produce in the cavity a second electric discharge along a portion of plane known as the second discharge plane, this plane being parallel to the optical axis of the cavity, and not coplanar with the first discharge plane. The intersection of the planes is defined by the two discharge planes defining substantially a straight line contained in the cavity, characterized in that the power gains of the two electric discharges are respectively less than the losses of the cavity and in that their sum is at least equal to the losses.

Other characteristics and advantages of the present invention will become apparent from the following description given with reference to the accompanying drawing by way of illustration but having no limiting character, in which:

DESCRIPTION OF THE PREFERRED EMBODIMENT

Figure 1:
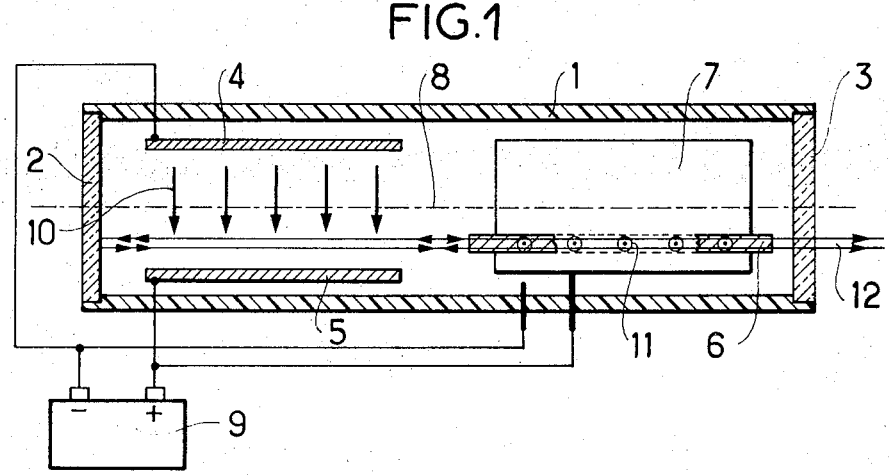
FIG. 1 shows a diagrammatic section of an embodiment of a laser generator device according to the invention.

The laser generator shown in FIG. 1 comprises an enclosure 1 supporting at its two ends respectively two mirrors 2 abd 3 forming an optical resonant cavity of the Perot-Fabry type, one of these mirrors possibly being semi-transparent, as, for example, the mirror 3, to enable a part of the laser beam, originating in the cavity, to emerge therefrom.

That enclosure 1 is filled with a gaseous medium such as, for example, a mixture of carbon monoxide, nitrogen and helium, the gaseous medium possibly flowing in the enclosure. The enclosure comprises also, two groups of electrodes consisting respectively of a cathode and an anode, for example, the first group consists of the cathode 4 and the anode 5 and for the second group, the cathode 6 and the anode 7. The cathodes of these two groups of electrodes are arranged to produce, with the anodes which are respectively connected therewith, an electric discharge defining substantially a portion of a plane known as the discharge plane. For that purpose, the cathode generally consists of a very thin rod arranged facing a metal plate comprising the anode. The two groups of electrodes are arranged so that the two planes defined by the plane discharge portions are parallel to the optical axis 8 of the resonant cavity, but are not coplanar, and that they intersect each other, moreover, along a straight line contained in the cavity. The cathodes and the anodes of these two groups are connected respectively to the negative terminal and to the positive terminal of an electric current supply 9 whose output voltage is chosen so that the power gain of each electric discharge of these two groups is respectivley less than the losses of the resonant cavity defined by the two mirrors 2 and 3 but that the sum of these two gains is at least equal to, or even greater than, those same losses. The operation of the laser generator is as follows:

The two groups of electrodes being energized produce two discharges shown in FIG. 1 by the arrows 10 comprised in the plane of FIG. 1 and the marks 11 showing a discharge perpendicular to the plane of the figure.

As the gain of each discharge is less than the losses of the cavity but their sum is greater than those losses, the laser phenomenom will take place only in the portion common to the two planes defined by the discharge planes. Thus, FIG. 1 shows the laser beam 12 on the straight line of intersection of the two discharge planes. With such a device, it is therefore easy to obtain, at the output of the cavity, a narrow light beam 12, having a position determined by the respective position of the electrodes of the two groups of electrodes.

Figure 2:
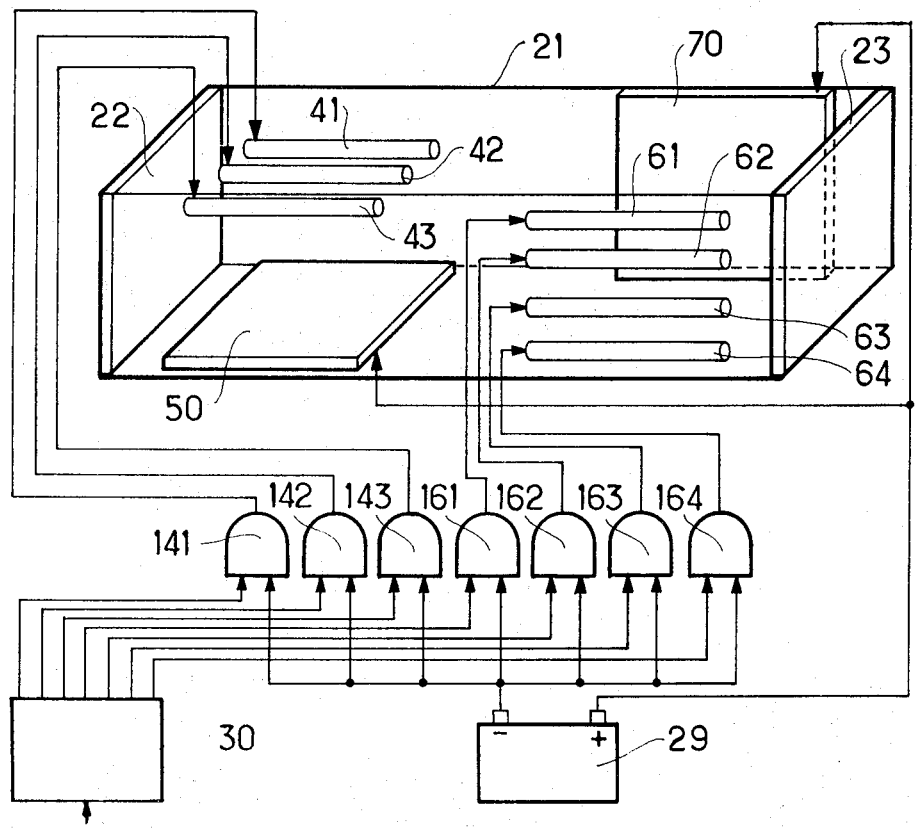
FIG. 2 shows a second embodiment, affording great advantages, of another laser generator device according to the invention.

It is even possible to produce several thin and parallel beams at the output of a same laser generator as with that which is shown in FIG. 2.

The laser generator shown in FIG. 2 by a diagrammatic perspective view comprises an enclosure 21 closed at its two ends by two mirrors 22 and 23 forming an optical resonant cavity of the Perot-Fabry type. That enclosure 21 filled with a gaseous active medium comprises, at least, two groups of electrodes each comprising several cathodes connected with anodes, or to a single anode, capable of giving two groups of discharges in a plane. In each group of electrodes, the discharge planes are parallel to one another and to the optical axis of the cavity defined by the two mirrors 22 and 23. Moreover, the planes of each of the two groups of discharges are non-coincident and each discharge plane of one group intersects with a discharge plane of the other group, substantially along a straight line parallel to the optical axis of the cavity and contained in the latter. FIG. 2 shows a first group of electrodes comprising three cathodes 41, 42, 43 connected with a single anode 50 and the second group comprising four cathodes 61, 62, 63, 64, connected with an anode 70. The anodes 50 and 70 are both connected to the positive terminal of an electric current supply 29, whereas the cathodes of these two groups are connected to the negative terminal of that same current supply 29 through controllable switches 141, 142, 143, 161, 162, 163, 164 shown diagrammatically in the figure by electronic switches consisting of AND gates one of whose inputs is connected to the negative terminal of the supply 29, the output being connected to a cathode, and the second input being connected to one of the outputs of a control element 30 for controlling the operation of the gates.

The voltage supplied by the electric current supply makes it possible to produce discharge planes substantially in a plane so that for an electric discharge, its power gain is less than the losses of the cavity, but the sum of the power gain of an electric discharge of a first cathode-anode group with a discharge of the second group of electrodes is at least equal to the losses of the cavity.

The operation of the laser generator device such as described in FIG. 2 is identical to that in FIG. 1. But with such a generator, it is possible to produce several thin light beams parallel to one another at the output of the laser cavity. In the case of the laser generator according to FIG. 2, the first group of electrodes enabling three discharges to be produced, and the second group enabling four discharges to be produced, it is therefore possible to produce a maximum of three times four laser beams at the output of the laser generator, that is, the number of intersections possible for the discharge planes of the first group with that of the second group of electrodes; in other words, it is possible to produce 12 light beams at the output. Only a definite number of these, less than twelve, can be controlled, and in a determined order, this making it possible to obtain the generating of light pulses which are more or less long and may represent a given code. By connecting a converging lens or any other optical element having non-zero vergency with the output of a laser generator such as described above, it is possible to produce a generator of beams which may be directed, as in the case of the figure, in twelve determined angular positions. An application affording particular advantages may be found for such a generator, more especially in the restoring of superimposed hologrammes on a same photographic plate.

It must be understood that the invention is in no way limited to the embodiment described and illustrated, which has been given only by way of an example. More particularly, without going beyond the scope of the invention, certain arrangements may be changed or certain means may be replaced by equivalent means.

What is claimed is:

1. A laser generator device comprising an optical resonant cavity including an active medium; first means for producing, in the cavity, an electric discharge, in the medium, substantially along a portion of a first discharge plane, said first discharge plane being parallel to the optical axis of the cavity; second means for producing, in the cavity, a second electric discharge along a portion of a second discharge plane, the second discharge plane being parallel to the optical axis of the cavity and not coplanar with the first discharge plane, the first and second discharge planes intersecting substantially on a straight line contained in the cavity, wherein the individual power gains of the electric discharges in the first and second discharge planes are respectively less than the losses of the cavity and the sum is at least equal to the losses in the cavity whereby a laser beam is produced only at the intersection of the first and second discharge planes.

2. A laser generator device comprising an optical resonant cavity; first means for producing, in the cavity, an electric discharge along portions of a plurality of first discharge planes, the first discharge planes being parallel to one another and to the optical axis of the cavity; second means for producing, in the cavity, electric discharges along portions of a plurality of second discharge planes, the second discharge planes being parallel to one another and to the axis of the cavity, but not coplanar with the first discharge planes and the discharge planes produced by the first and second means intersect on straight lines within the cavity, and wherein the individual power gain of the discharges produced with the first and second means is less than the losses of the cavity and the sum of the gains of discharges produced by the first and second means is at least equal to the losses in the cavity, whereby a laser beam is produced only along the intersections of the first and second discharge planes.

* * * * *